April 9, 1963

L. DREES 3,084,955

MULTIPLE-WRITING SET

Filed May 11, 1959

INVENTOR
Lothar Drees
Ernest Montague
Attorney

_United States Patent Office_

3,084,955
Patented Apr. 9, 1963

3,084,955
MULTIPLE-WRITING SET
Lothar Drees, Untere Lichtenplatzerstr. 77,
Wuppertal-Barmen, Germany
Filed May 11, 1959, Ser. No. 812,351
1 Claim. (Cl. 282—11.5)

The present invention relates to a multiple-writing set, wherein two or more individual parts are disposed one on top of the other for the purpose of simultaneous writing thereon, said parts being sewed together at one or, if necessary, on a plurality of positions or points.

In the manufacture of multiple-writing sets, it is usual to connect the individual parts forming the set, which comprises as a rule two or more leaves, sheets or runs of equal and/or different characteristics as to its size, weight, surface or the like, for instance by means of gluing, stitching or the like.

In this connection it is of importance, that the joining of the individual parts forming a set is assured as long, until an exact and unitary writing-through is obtained. A further point which must be observed in connection with the joining of the elements, resides in the fact that after the writing, a possibly simple disassembly into the originally joined individual parts is to be obtained fast and without any difficulty.

It is known that in the joining of the individual elements by gluing, as well as by joining by means of clamps, or other joining methods of the sets, a plurality of drawbacks arise, since both joining methods do not live up to the desirable requirements concerning the short term rigid joining, particularly great smoothness, resistance against heat and the avoiding of disturbances or the like, and the papers cannot be used as fully as to their total size.

Furthermore, in the known multiple-writing sets it is unavoidable that the individual parts, forming the set, cover each other at least at one side. The simple separation in the sense of resorting is likewise not completely satisfactory, particularly in such cases where multiple sets, each having a plurality of sheets, are to be handled.

It is, therefore, one object of the present invention to provide a multiple-writing set which brings about advantages not only to the manufacturer, but also to the user, and in which the writing set is extremely superior as to its arrangement possibilities, as to its simplification of manufacture, and as to its possibilities relating to its use and application, compared with all known writing sets.

It is another object of the present invention to provide a multiple-writing set, wherein an easily releasable thread-shaped or wire-shaped pulling means is threaded through all individual parts forming the set, said pulling means being, for instance, a textile thread, a thin wire or a pulling means as a monofil wire, preferably a thread or wire-like pulling organ of artificial material, whereby it has been found of particular advantage to use a warp seam.

By using the joining of a writing set in accordance with the present invention by means of an easily releasable seam, it has been made possible, and this is one of the basic concepts of the present invention, in the first place to simplify the joining of a multiple writing set with the result, that now the sets may be completely prepared and finished by a running assembly line. During the assembly of the elements, carbon paper may be included. Manual labor is, by this arrangement, eliminated. A set joined by machine may be retained in simple manner at any chosen point, at the head, at the foot, on the side or the like, by means of the seam joining the individual parts.

It is still another object of the present invention to provide a multiple-writing set, which comprises one or a plurality of releasable pulling organs for warping together said elements and to releasably connect said set with at least one individual sheet by means of an equal main connecting seam so that upon releasing the main seam, the total set is divided in at least one individual writing set and one individual sheet and in individual writing sets, respectively.

By this arrangement it is made possible to join individual parts which are not equal in size for the purpose of receiving the same writing and simultaneously to write thereon in a machine, whereby upon termination of the writing, the individual parts may be separated again by simple removal of the main pulling organ.

In addition, the present invention offers further rather important advantages concerning the joining and retaining of the set on the one hand, and the separation of the set on the other hand. In particular, the connection seam of the set is complete as to its rigidity and reliability. Also, if the set is to be separated, practically with one single step a set may be separated after performing the writing thereon.

This is of particular advantage for the reason, that the seam formed by the thread may be loosened already in the typewriter and the set may be separated into sheets, for instance in case of corrections or for faster removal of an individual sheet, for instance of an addressing label or the like. Furthermore, it has been found advantageous to have the carbon paper with its white margin and its gripping edge to overlap at the head of the set, whereby the set is narrowed towards the end of the head and thus may be easier inserted into the typewriter. If sufficient width of a white margin is provided, the typist does not touch anymore the layer of the carbon paper. On the other hand, the carbon paper may extend totally to the lower edge of the set which is favorable on the one hand for the manufacture, and on the other hand, during the use of the set for the writing-through up to the lower edge. It also suffices now to provide a comparatively small gripping corner at the foot of the set, in order to separate the typing sheets from the carbon paper.

If it is desirable to remove one or more individual typing sheets after part typing on the set, a perforation below the seam will suffice. The remaining strip after the tearing is removable with the carbon papers.

If, for particular users, the punctures which are negligible in general and which do not disturb, in connection with copies, for inside office use, in accordance with the present invention merely the first sheet, namely the original sheet, has a perforation disposed parallel to the seam, so that this first sheet may be removed or torn off along said perforation. In this manner, a non-perforated original sheet reaches the customer, though it has been found in practice that this matter is of negligible importance, since even accurate customers prefer to receive the full size of the sheet.

With these and other objects in view, which will become apparent in the following detailed description, the present invention will be clearly understood in connection with the accompanying drawing, in which.

Figure 1:
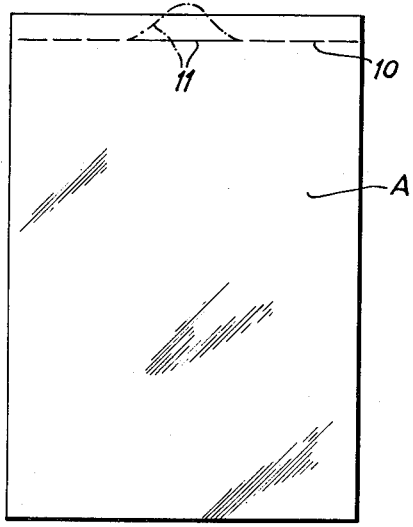
FIGURE 1 is a top plan view of a normal writing set which is kept together by a seam.

Referring now to the drawing and in particular to FIG. 1, the writing set A is held together in such a manner that preferably it has in its top portion a seam 10 which may be formed preferably as a looming seam, a warp seam or a stitching seam with loose underthread or the like. The connecting seam 10 is formed at about its center as a gripping loop 11.

Figure 2:
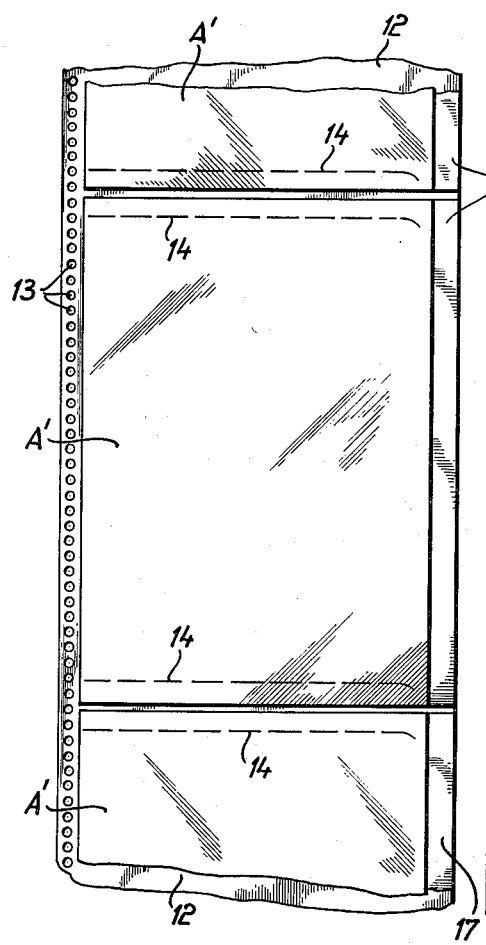
FIG. 2 is a top plan view of a plurality of writing sets sewn on an endless carrier.

Referring now to FIG. 2, an embodiment of the present invention is disclosed wherein the writing sets A' are equipped with laterally projecting carbon paper—white margins 17 provided on an endless carrier 12, and if required also with one or two lateral perforation guides 13, the individual sets A' being connected with the carrier 12 by means of a connecting seam 14. The latter is provided in the head portion as well as in the foot portion of the writing set A', in accordance with the present invention.

Figure 3:
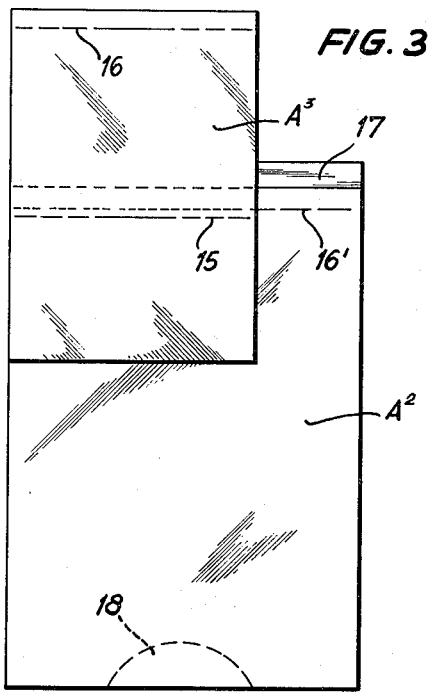
FIG. 3 discloses two individual sets of unequal size, sewn one on top of the other.

Referring now to FIG. 3, a still further embodiment of the present invention is disclosed, where two individual sets $A^2$ and $A^3$ of different size are superposed upon each other and connected by means of a connecting seam 15 in such a manner that both sets may be written or typed on simultaneously with one insertion into the typewriter. Both individual sets $A^2$ and $A^3$ are held together by means of a head seam 16 and 16', respectively. The uppermost set $A^3$ may be separated from the lower set $A^2$ after common typing on both sets by removal of the thread 15, whereby one of the sets, upon removal of the other, may remain in the typewriter. In this way, it is possible to join other typewritten forms with a second or even third set and to write jointly thereon in part. The carbon paper has an upper white margin 17, while it has on the bottom a gripping zone 18 in the carbon paper.

As already stated before, the shown and described embodiments are merely examples of an application of the present invention, and the latter is not limited thereto, rather within the scope of the present invention some other embodiments and applications relative to the combination of one or more sets is possible. Furthermore, also such typing sets may be joined with one seam, the front and/or rear sides of which are prepared in such a way that they provide carbon copies by pressure, as for instance by handwriting, typewriting or the like. It is also possible to join writing sets, the individual sheets of which are chemically prepared on the back-side for the purpose of writing through, the individual sheets being joined by one of the previously mentioned seams or the like. All sets to be written on may be connected in accordance with the means set forth above and may be also, without difficulty, taken apart again.

This is also possible if not only writing sheets are used but the set also contains individual parts for simultaneous writing thereon, which could not at all, or only with difficulty, be worked into the set, for instance mailing bags, folded sheets or the like.

While I have disclosed several embodiments of the present invention, it is to be understood that these embodiments are given by example only and not in a limiting sense, the scope of the present invention being determined by the objects and the claim.

I claim:

A multiple-writing set comprising an endless longitudinal carrier and a plurality of writing sets releasably secured to said endless carrier, said writing sets consisting of a top writing paper sheet and a carbon paper sheet, the latter being wider than said top writing paper sheet to form a margin extending beyond the edge of said top writing paper sheet to facilitate separation of said carbon sheet from said top writing paper sheet, a connecting seam consisting of an easily removable pull thread disposed at the top and at the bottom of each of said writing sets and extending across said endless carrier, so that a plurality of said connecting seams are provided spaced apart from each other along said endless carrier.

References Cited in the file of this patent
UNITED STATES PATENTS

| | | |
|---|---|---|
| 1,765,979 | Johnson | June 24, 1930 |
| 1,955,071 | Johnson | Apr. 17, 1934 |
| 2,108,595 | Phillips et al. | Feb. 15, 1938 |
| 2,226,574 | O'Brien | Dec. 31, 1940 |
| 2,272,325 | Liebich | Feb. 10, 1942 |